Patented Jan. 12, 1943

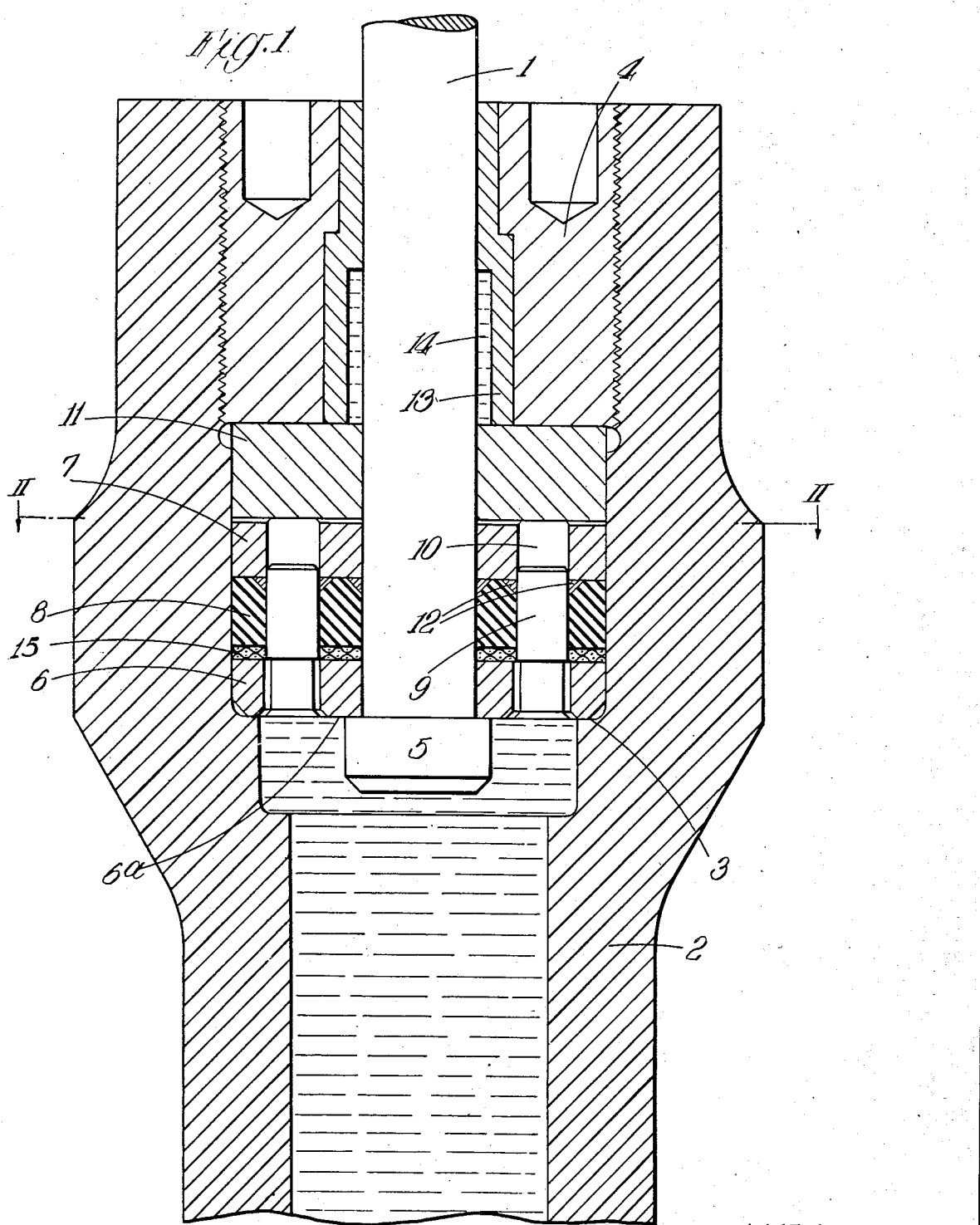

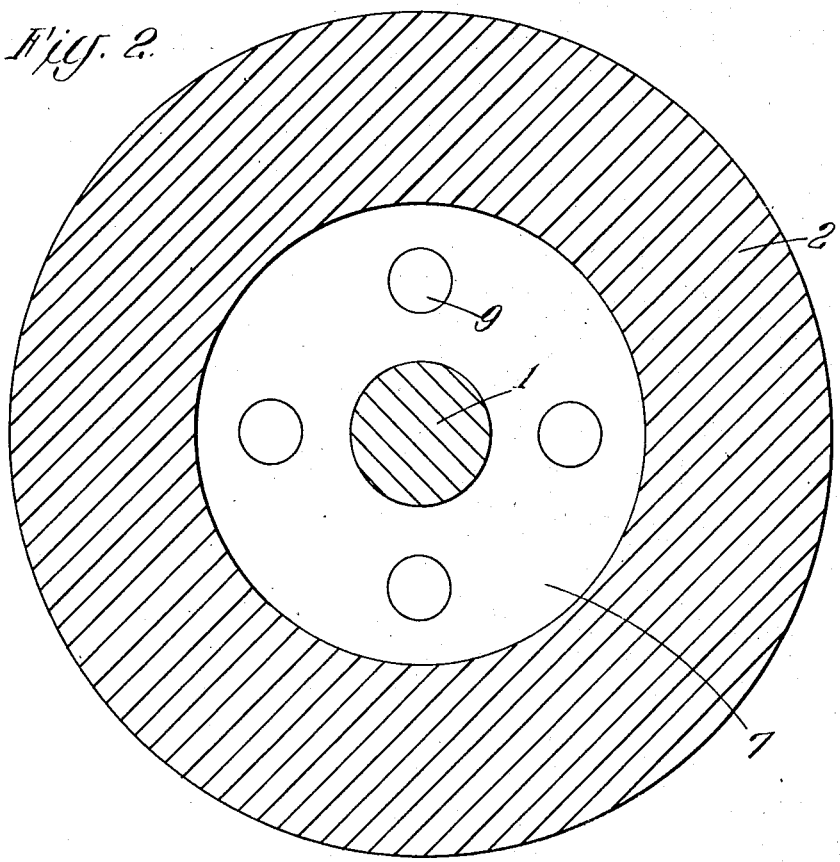
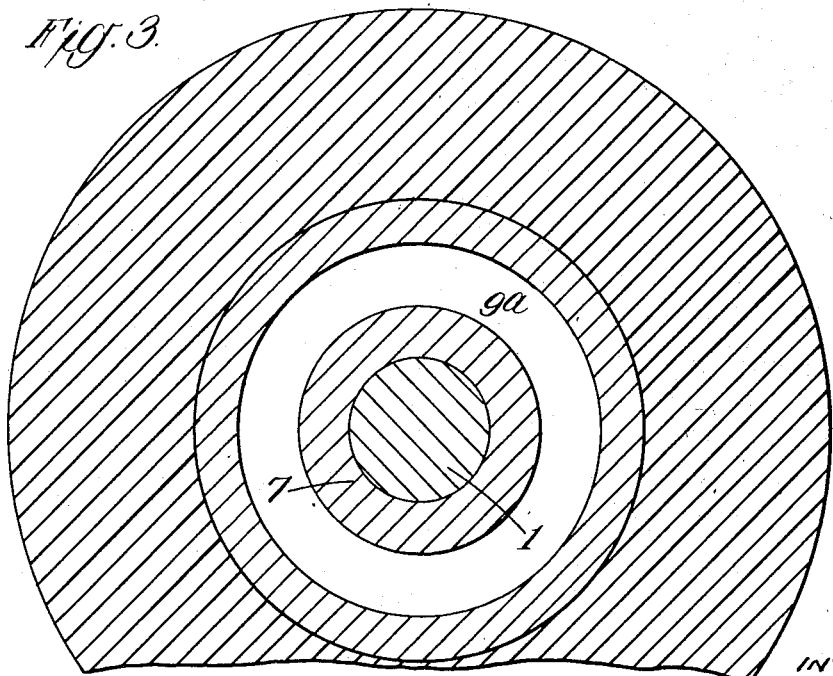

2,308,149

UNITED STATES PATENT OFFICE 2,308,149

PACKING GLAND

Arthur Edward Bingham, Cheltenham, England, assignor to Dowty Equipment Limited, Cheltenham, England Application May 24, 1941, Serial No. 395,109
In Great Britain June 22, 1940

2 Claims. (Cl. 286—26)

This invention relates to packing glands of the kind employed to afford a fluid-tight seal between a high pressure chamber and a plunger slidable with respect thereto.

The present invention consists in a packing gland of the kind set forth, including resilient material confined between the plunger and the cylinder and in axial compression between two confining surfaces, of which that remote from the interior of the high pressure chamber is of less area than that which is directly subjected to the chamber internal pressure whereby to induce in the resilient packing a pressure greater than that prevailing in the chamber and so to prevent leakage from the interior of the chamber.

The invention also includes certain constructional features provided to afford a comparatively simple construction of gland and to avoid deformation and excessive wear of the resilient part of the gland.

In order that it may be clearly understood and readily carried into effect, the invention is hereinafter described with reference to the accompanying diagrammatic drawings, of which:

Figure 1 is a fragmentary side elevation in section of a gland according to the present invention;

Figure 2 is a section on the line II—II of Figure 1; while

Figure 3 is a section corresponding to Figure 2 showing a modified construction.

Referring now to Figures 1 and 2 of the drawings, the reference numeral 1 indicates the plunger and 2 the cylinder between which the gland is required to be operative. The cylinder is formed with a stepped portion 3 against which the gland is tightened up by means of the closure plug 4 which is threaded or otherwise suitably secured in the mouth of the cylinder 2. The plunger passes through the closure plug and the gland and is provided internally with the enlarged head 5. The actual gland is composed of three rings, i. e., the steel pressure ring 6, the brass backing ring 7, and the intermediate packing ring 8, preferably formed of synthetic rubber or other material which, whilst being resiliently deformable, is substantially non-compressible. About the axis of the plunger and parallel therewith, there extends back from the pressure ring 6 the spaced pegs 9. Their number and cross-sectional size are chosen with relation to the pressure which it is desired to exert on the ring 8, as will appear. The pegs 9 are secured to the pressure ring 6 in any convenient manner and project through apertures in the resilient packing ring 8, also entering the apertures 10 in the brass backing ring 7. It is preferred in most cases to provide a spacer ring 11 which may be provided between the closure plug 4 and the brass backing ring 7, but this ring 11 is unnecessary to the correct functioning of the gland.

Whatever may be the absolute value of the pressure of the entrapped fluid against the pressure ring 6, that same absolute value is impressed upon the packing ring 8, and through the latter upon the backing ring 7. The effective area of the packing ring 8 and of the packing ring 7 is, however, less than the area of the pressure ring 6, inasmuch as the area of rings 8 and 7 is reduced by the aggregate cross-sectional area of the holes wherein are received the pegs 9. These pegs transmit pressure to the pressure ring 6, wherein they are secured, but may move axially with respect to the rings 8 and 7, hence transmit no pressure to the latter. It follows that the identical absolute pressure effective over the larger area 6a is transmitted to ring 8 and to ring 7 as a greater pressure per unit area effective upon these rings 8 and 7 of lesser unit area. Such greater pressure per unit area effective at the packing ring 8 tends to deform the latter, to press it outwardly more firmly against the cylindrical wall, inwardly more firmly about the plunger 1 and pegs 9, and axially more firmly against the adjoining rings 6 and 11, always with a pressure per unit area higher than the pressure per unit area of the fluid within the cylinder. In consequence, leakage outwardly of the gland is effectively prevented at all points.

When operating at high pressures there may be some tendency for the edges of the resilient packing ring 8 to be cut or worn by the moving surfaces with which they co-operate. To prevent that wearing or cutting therefore, it is proposed to chamber off the edges and complete the profile by brass edge protecting rings, as indicated at 12.

The pressures developed being extremely high, it is obvious that the pressure fluid will almost inevitably find its way through the clearances between the plunger and the pressure ring 6, the pressure ring and the wall of the cylinder, and even the shanks of the pegs 9 and the pressure ring, and thence will enter the space between the pressure ring 6 and the resilient packing ring 8. If such fluid be there entrapped, it would create liquid bubbles at high pressure, and these, growing with each application of pressure within the cylinder, would seriously distort and cause failure of the packing ring 8. Any such bubbles of fluid between the contacting faces of the rings 6 and 8 can, however, drain back to the interior of the cylinder by the same passages which gave them entrance, provided the resilient packing ring 8 does not so tightly press against the pressure ring 6 that communication with the entrance and drainage channels or clearances is blocked. To prevent such blockage, it is necessary to insure that the faces of the rings 6 and 8 are held somewhat apart, even under the most extreme pressure, to which end may be used one or more layers of foraminated material, as fine wire gauze 15. The wires of such gauze, by their intersection, provide small cells, each in communication with all others, and hence affording channels by which any otherwise entrapped fluid can find its way back to the clearance spaces by which it entered, and thence back to the interior of the cylinder.

The arrangement illustrated in Figure 3 differs from that described with reference to Figures 1 and 2 only in that instead of the spaced pegs 9 there extends back from the pressure ring 6 a continuous annular flange 9A. The function of the arrangement shown in Figure 3 is precisely the same as that described with reference to Figures 1 and 2, but it follows that due to the continuous formation of the flange 9A, the backing ring and the intermediate packing ring are then each composed of two annular rings located respectively by the plunger and the cylinder wall to maintain spaced relationship for the reception of the flange 9A.

Obviously, the construction may be varied from that hereinbefore described without departing from the nature of the invention. Thus the release of pressure from between the resilient packing ring 8 and the back of the steel pressure ring 6 can be achieved by other means.

It will further be realized that the pressure and backing rings, as well as the intermediate resilient packing ring, may be of materials other than those above described. The materials stated, however, have been found to be particularly suitable for providing a packing effective against high internal pressures of the order of 50,000 lbs. per square inch.

For lubrication of the plunger 1, the bush 13 in the closure plug 4 is formed with an annulus 14 which is packed with grease or oil.

What I claim is:

1. In a packing gland for sealing a plunger or the like within its chamber, a resiliently deformable packing radially confined between the plunger and the chamber and axially confined between, on the one hand, a fixed backing member on the face of the resiliently deformable packing remote from the interior of the chamber and, on the other hand, a pressure member subjected to chamber internal pressure, a foraminated means interposed between the packing and said pressure member, affording interstices for drainage, the pressure member having a projection through the resiliently deformable packing into a recess in the backing member slidably receiving the projection, the pressure member thereby having an area corresponding to the area of the projection unsupported by the backing member, such unsupported area being effective to induce in the resiliently deformable member a pressure greater than that internally of the chamber.

2. An arrangement as set forth in claim 1, in which the foraminated means comprises a plurality of gauze layers.

ARTHUR EDWARD BINGHAM.